US005310198A

United States Patent [19]
Belter

[11] Patent Number: 5,310,198
[45] Date of Patent: May 10, 1994

[54] ONE PIECE METERING BAFFLE INSERT FOR A GASKET

[75] Inventor: Jerome G. Belter, Mt. Prospect, Ill.

[73] Assignee: Dana Corporation, Toledo, Ohio

[21] Appl. No.: 895,574

[22] Filed: Jun. 8, 1992

Related U.S. Application Data

[63] Continuation of Ser. No. 590,509, Sep. 27, 1990, abandoned, which is a continuation of Ser. No. 291,545, Dec. 29, 1988, abandoned.

[51] Int. Cl.[5] .......... F16J 15/06

[52] U.S. Cl. .......... 277/235 B; 277/178; 277/189

[58] Field of Search .......... 277/235 B, 181, 178, 277/183, 189, 166, 1; 285/12, 177, 901, 922, 80, 330, 378; 220/323, 324, 307; 29/513, 509

[56] References Cited

U.S. PATENT DOCUMENTS 1,557,775 10/1925 Robertson .......... 277/235 B
1,565,918 12/1925 Fitzgerald .......... 277/235 B
2,519,436 8/1950 Cadman .......... 277/235 B
3,108,818 10/1963 Furstenburg .......... 277/189
3,565,449 2/1971 Ascensio et al. .......... 277/235 B
4,036,191 7/1977 Numata et al. .
4,126,318 11/1978 Belter .
4,405,138 9/1983 Skrycki .......... 277/235 B
4,505,486 3/1985 Skrycki .......... 277/235 B
4,534,572 8/1985 Belter .

FOREIGN PATENT DOCUMENTS 2092244 8/1982 United Kingdom .......... 277/235 B

*Primary Examiner*—William A. Cuchlinski, Jr.
*Assistant Examiner*—Daniel G. DePumpo
*Attorney, Agent, or Firm*—MacMillan, Sobanski & Todd

[57] ABSTRACT

A one-piece baffle/metering insert is utilized to block or partially restrict the flow of fluid through an aperture formed in a gasket. The insert is constructed of a single piece of stainless steel and is provided with two pair of flange portions about its outer periphery which enables the entire periphery of the insert to be sealingly secured within the gasket aperture. The present invention also includes a unique method of securing the insert within an associated gasket aperture.

4 Claims, 3 Drawing Sheets

ONE PIECE METERING BAFFLE INSERT FOR A GASKET

CROSS-REFERENCE TO RELATED APPLICATIONS

This application is a continuation of U.S. application Ser. No. 07/590,509, now abandoned, which is a continuation of U.S. Pat. application Ser. No. 07/291,545 filed Dec. 29, 1988, now abandoned.

BACKGROUND OF THE INVENTION

The present invention relates generally to gasket assemblies and, more particularly, to an insert for mounting in an aperture of a standard size gasket. The insert can either function as a baffle to completely block the gasket aperture, or as a metering device which provides a predetermined size aperture for precisely controlling fluid flow therethrough.

Heretofore, gasket manufacturers have produced standardized gasket designs and have modified these gaskets by use of gasket attachments or inserts in order that a single gasket design can be used in several different applications. Gasket attachments typically are used to either fully or partially block openings in a standard size gasket, or to create additional sealing surfaces which extend therefrom. By utilizing these gasket attachments, the associated manufacturing costs can be substantially reduced.

Examples of gasket inserts which can be used to partially reduce the opening through a gasket aperture are disclosed in U.S. Pat. Nos. 4,126,318 and 4,405,138. Examples of gasket inserts which can be utilized to completely block an opening in a gasket aperture are disclosed in U.S. Pat. Nos. 4,505,486 and 4,534,572.

SUMMARY OF THE INVENTION

The present invention is concerned with a one-piece baffle/metering insert which is utilized to block or partially restrict the flow of fluid through an aperture formed in a gasket. The present invention is also concerned with a unique method of securing the insert within an associated gasket aperture. In the preferred embodiments of the invention, the insert has been proposed for use as an EGR metering gasket or as a baffle in an intake manifold gasket.

In particular, the insert is constructed of a single piece of stainless steel sheet material and includes a peripheral portion which generally corresponds to the shape of the gasket aperture, and is adapted to sealingly engage an edge surface of the gasket aperture. Further, the insert includes a first pair of flanges for engaging one surface of the gasket, and a second pair of flanges which are crimped against the opposite surface of the gasket to secure the insert to the gasket. The central portion of the insert can either be adapted to function as a baffle and completely block the gasket aperture, or it can be provided with a predetermined aperture for precisely metering fluid flow through the gasket aperture. In both cases, the central portion of the gasket is provided with an inner formed portion for increasing the overall strength of the insert.

It has been found that a gasket insert having a single piece construction of the present invention provides an effective means of securing the insert to the gasket aperture, while insuring that the entire peripheral portion of the insert is in sealing engagement with the inner edge portion of the gasket aperture.

The above, as well as other advantages of the present invention, will become readily apparent to one skilled in the art from reviewing the following detailed description of the invention in conjunction with the attached drawings.

DESCRIPTION OF THE PREFERRED EMBODIMENT

Figure 1:
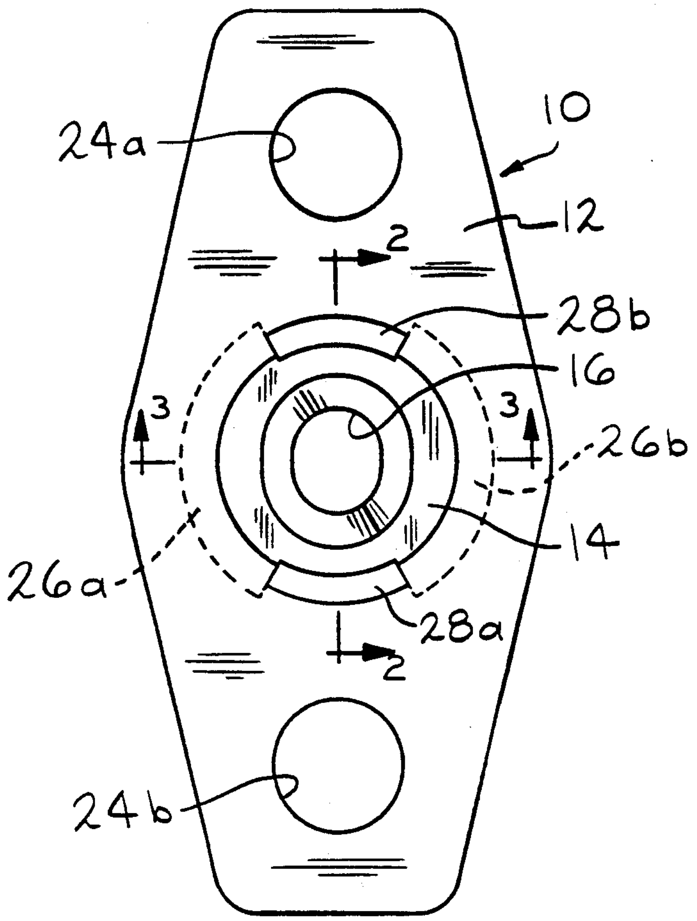
FIG. 1 is a plan view illustrating a gasket assembly including a gasket insert embodying the principles of the present invention for use as a metering device in a engine EGR system.

Referring first to FIGS. 1 through 4, there is shown a gasket assembly 10 which uses an insert according to the present invention which is designed to function as a metering device. The particular gasket assembly shown in FIGS. 1 through 4 is specifically designed for use as a metering device in an automotive exhaust gas recirculation (EGR) system. The gasket assembly 10 includes a main gasket body 12 and a generally circular-shaped insert 14. The insert 14 is provided with a central aperture 16 of a predetermined size. Typically, the gasket 12 is constructed of a graphite composite main portion 18, which is reinforced with stainless steel members 20. The insert 14 is typically of a one-piece stainless steel construction.

Figure 4:
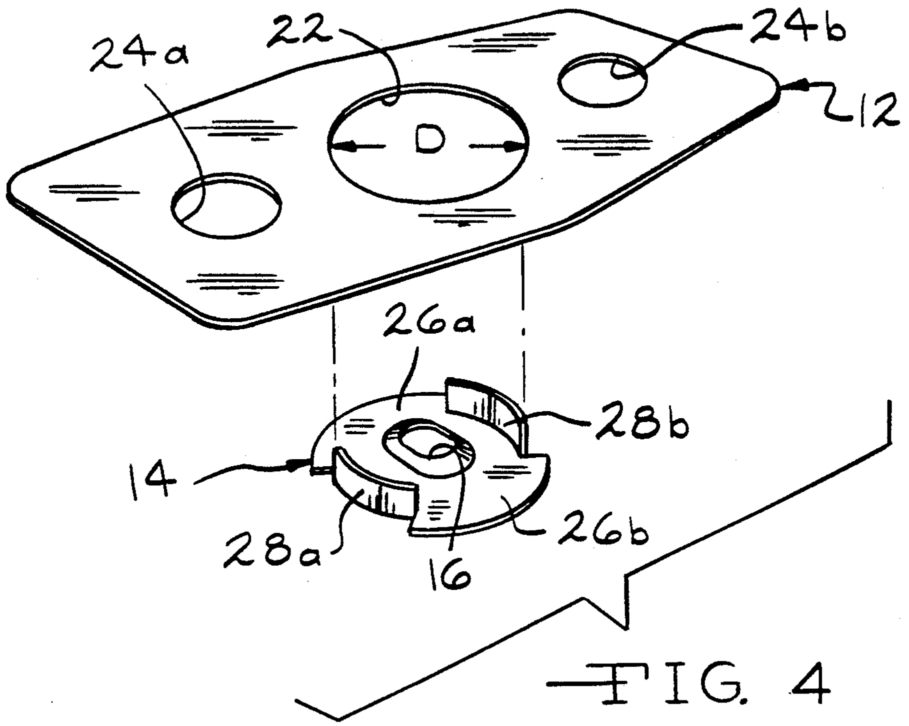
FIG. 4 is an exploded perspective view generally illustrating the manner in which the insert of FIG. 1 is assembled with its associated gasket member.

The gasket body 12 is provided with a central circular aperture 22 for receiving the insert, and two smaller diameter apertures 24*a* and 24*b* which are adapted to receive conventional mounting bolts. As shown in FIG. 4, prior to being secured to the gasket body 12, the insert 14 is formed to include a pair of radially extending flanges 26*a* and 26*b* (parallel to the gasket body 12) and a pair of upstanding or axially extending circular flanges 28*a* and 28*b* (perpendicular to the flanges 26*a* and 26*b*). The central aperture 22 in the gasket body 12 is formed of a diameter D which corresponds to the diameter of the circular flanges 28*a* and 28*b*.

Figure 2:
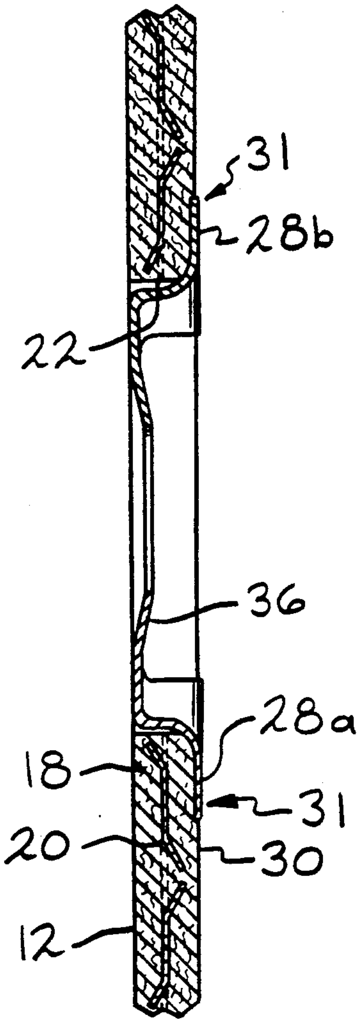
FIG. 2 is a sectional view taken along the line 2—2 of FIG. 1.
Figure 3:
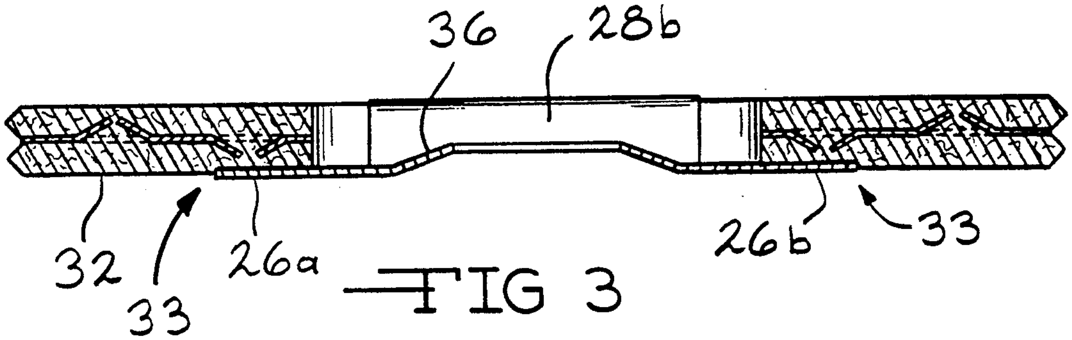
FIG. 3 is a sectional view taken along the line 3—3 of FIG. 1.

When assembling the gasket assembly 10, the flanges 28*a* and 28*b* of the insert 14 are inserted through the aperture 22, and then are crimped downwardly against the one surface 30 of the gasket member 12 to sealingly engage the surface 30 by partially compressing it, as shown in FIG. 2 at areas 31. The flanges 28*a* and 28*b* are crimped in such a manner that the other flanges 26*a* and 26*b* partially compress and sealingly engage the opposite surface 32 of the gasket member 12, as shown in FIG. 3 at areas 33. Since collectively the flanges 26*a* and 26*b* and 28*a* and 28*b* surround the entire periphery of the insert, the insert will be in sealing engagement with the gasket member 12 about its entire periphery. Thus, fluid flow through the gasket aperture 22 will only be permitted through the insert aperture 16. The insert can be provided with a central, preformed portion 36 for increasing the strength of the insert.

Figure 8:
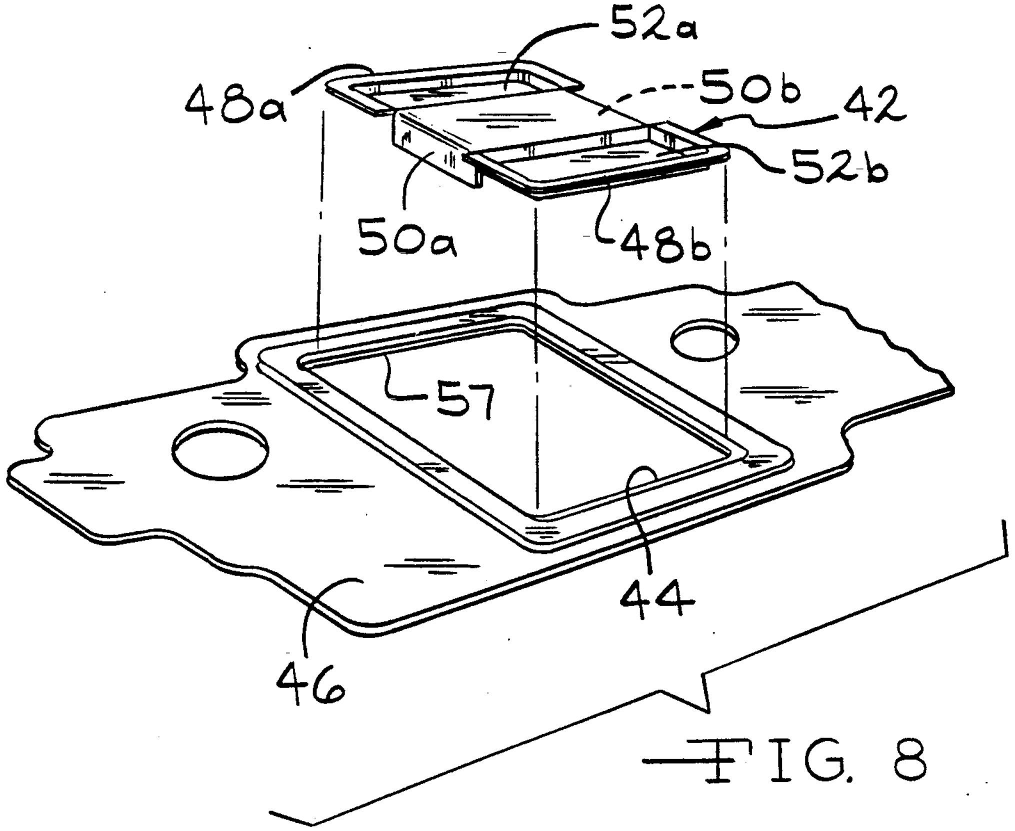
FIG. 8 is an exploded perspective view generally illustrating the manner in which the insert of FIG. 5 is assembled with its associated gasket member.
Figure 5:
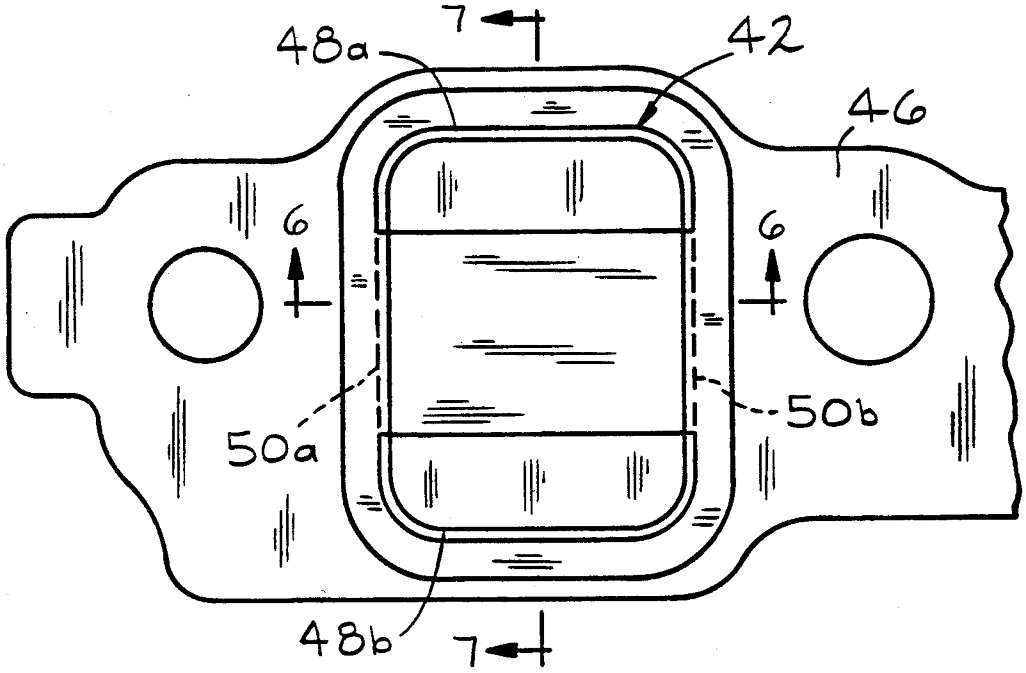
FIG. 5 is a plan view of a gasket assembly including an alternate embodiment of a gasket insert embodying the principles of the present invention for use as a baffle in an intake manifold gasket.

Referring now to FIGS. 5 through 8, there is shown an alternate embodiment of an insert embodying the principles of the present invention. FIG. 8 illustrates a generally rectangular-shaped insert 42 adapted to be placed and sealingly secured within a rectangular aperture 44 formed in a gasket member 46. The particular structure in FIGS. 5 through 8 is specifically adapted to block an opening in an intake manifold gasket. This opening is typically provided for coolant fluid flow between the cylinder heads and the intake manifold in a conventional carburated engine. When such cylinder heads are utilized in conjunction with a port fuel injected engine, there may be no need to circulate cooling fluid through the rear intake runners and thus, it is necessary to block these particular fluid passageways if standard cylinder heads are used.

The insert of FIGS. 5 through 8 is secured within the aperture of the gasket member 46 in a manner similar to the insert 14 of FIGS. 1 through 4 is secured to its associated gasket member. More specifically, as shown in FIG. 8, the insert 42 is provided with a pair of outwardly extending flanges 48*a* and 48*b* and a pair of downwardly extending flanges 50*a* and 50*b*. Collectively, the flanges 48*a*, 48*b*, 50*a* and 50*b* surround the entire periphery of the insert 42. The insert 42 is also provided with preformed, recessed areas 52*a* and 52*b* for increasing the overall strength of the insert.

Figure 6:
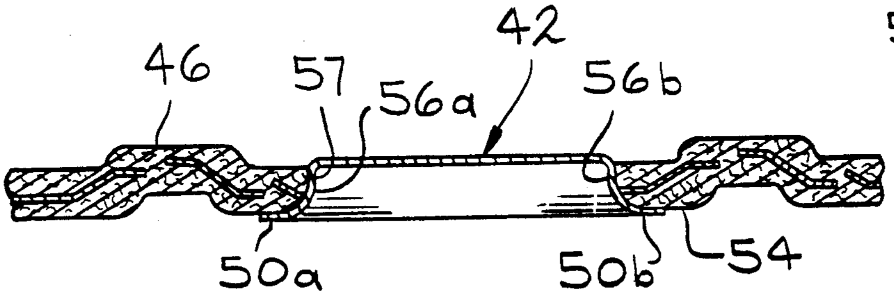
FIG. 6 is a sectional view taken along the line 6—6 of FIG. 5.
Figure 7:
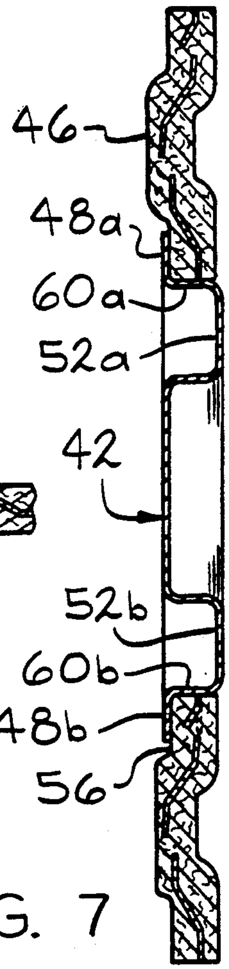
FIG. 7 is a sectional view taken along the line 7—7 of FIG. 5.

When assembling the insert 42, the insert is placed into the aperture 44 such that the flanges 50*a* and 50*b* project through the aperture. The flanges 50*a* and 50*b* are then crimped against the one surface 54 of the gasket member 46 to sealingly engage and partially compress the surface 54, as shown in FIG. 6. When the flanges 50*a* and 50*b* are crimped, the opposite flanges 48*a* and 48*b* will sealingly engage and partially compress the opposite gasket surface 56, as shown in FIG. 7. As shown in FIG. 6, the side walls 56*a* and 56*b* formed by the flanges 50*a* and 50*b* sealingly engage the edge wall 57 of the aperture 44. Similarly, as shown in FIG. 7, the side walls 60*a* and 60*b* of the flanges 48*a* and 48*b* sealingly engage coextensive portions of the edge wall 57 of the aperture 44. Thus, when assembled, the insert 42 is sealingly secured within the gasket aperture 44 about its entire peripheral portion to completely block fluid flow therethrough.

While the present invention has been illustrated and described in what is considered to represent its preferred embodiment, it will be appreciated that the invention can be practiced otherwise than as specifically illustrated and described. For example, the one-piece insert of the present invention can be constructed of materials other than stainless steel. Also, as illustrated in the two different embodiments, the insert can assume various configurations, depending on the particular gasket aperture in which it is to be mounted.

What is claimed:

1. A gasket assembly comprising:

a sheet of preformed gasket material having an aperture formed therein, said gasket aperture defining an inner edge surface; and a one-piece metallic insert having a main body with an outer periphery generally corresponding to the shape of said gasket aperture, said outer periphery including an outwardly facing side wall extending continuously around said outer periphery and engaging said inner edge surface of said gasket aperture in co-extensive and opposing relationship;

said insert including a plurality of first flanges connected to and extending outwardly from only a portion of said side wall and engaging only ne surface of said sheet;

said insert including a plurality of second flanges connected to and extending outwardly from only another portion of said side wall and engaging only an opposite surface of said sheet in alternating fashion with said first flanges;

said first and second flanges collectively cooperating to continuously surround said outer periphery of said main body.

2. The gasket assembly according to claim 1 wherein said main body includes a preformed, non-planar central portion for increasing the strength of said insert.

3. The gasket assembly according to claim 1 wherein said main body includes a central portion defining a metering aperture of a reduced size relative to the gasket aperture.

4. The gasket assembly according to claim 1 wherein said main body includes a central portion for completely blocking the gasket aperture.

* * * * *